O. PAGAN.
Tube-Expanders.

No. 156,373.

Patented Oct. 27, 1874.

UNITED STATES PATENT OFFICE.

ORESTES PAGAN, OF PHILADELPHIA, PENNSYLVANIA, ASSIGNOR OF ONE-HALF HIS RIGHT TO THOMAS L. RICART, OF SAME PLACE.

IMPROVEMENT IN TUBE-EXPANDERS.

Specification forming part of Letters Patent No. 156,373, dated October 27, 1874; application filed August 29, 1874.

*To all whom it may concern:*

Be it known that I, ORESTES PAGAN, of Philadelphia, in the county of Philadelphia and State of Pennsylvania, have invented certain new and useful Improvements in Tools for Fastening and Expanding Boiler-Tubes; and I do hereby declare the following to be a full, clear, and exact description of the invention, such as will enable others skilled in the art to which it pertains to make and use it, reference being had to the accompanying drawings, which form part of this specification, in which—

Figure 1:
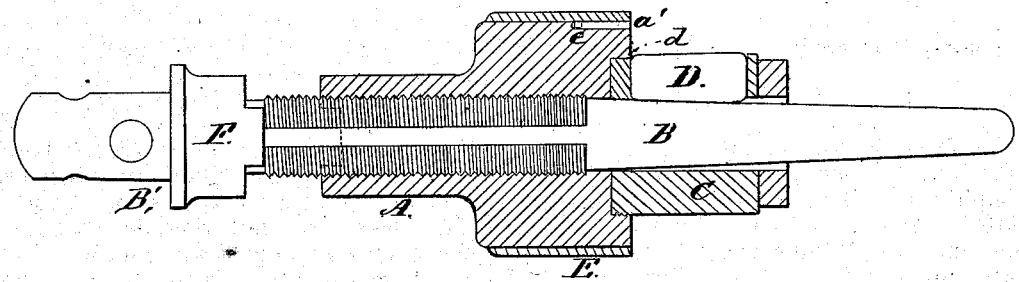
Figure 2:
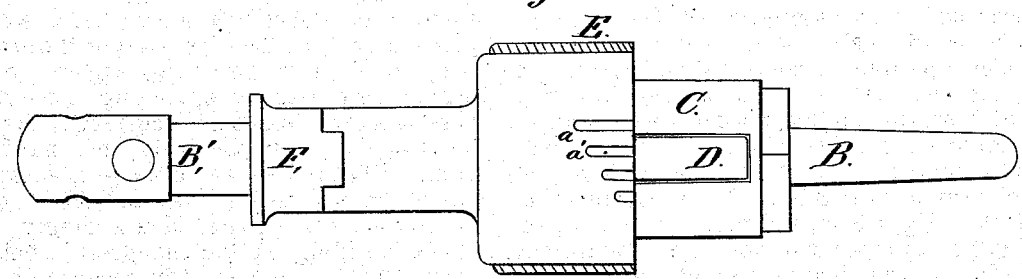
Figure 3:
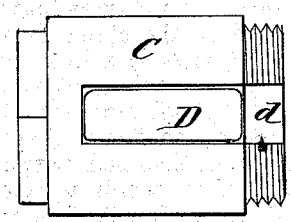
Figure 4:
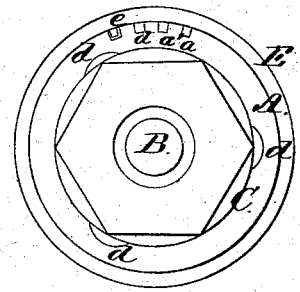
Figure 5:
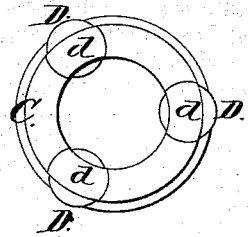

Figure 1 is a vertical longitudinal section of my invention. Fig. 2 is a side view and partial section. Fig. 3 is a side view of the roller-stock. Fig. 4 is an end view of the tool, and Fig. 5 is an inner end view of the roller-stock.

My invention has for its object to provide a tool for fastening and expanding boiler-tubes, so constructed that the mandrel may be advanced by screwing instead of by striking, as heretofore, in which the feed of the mandrel may be intermitted while the tool is being revolved for smoothing the flue, in which the exposure of the expanding-rollers may be regulated without the employment of a set-screw; and, lastly, in which the several parts shall be so constructed as to combine cheapness, efficiency, and durability in an eminent degree.

The nature of my invention accordingly consists, first, in forming the roller-stock or head solid, and inserting the rollers therein from the inner end, securing them by plugs instead of, as heretofore, from the outer end, and fastening them by means of a cap held on by screws; second, in the provision of an adjustable band having an internal stud engaging with grooves in the main stock or body, said grooves corresponding in depth to the thickness of the crown-sheet of the boiler; third, in the general combination of parts, as hereinafter fully described.

Referring to the accompanying drawing, A represents the main stock or body of the tool, bored longitudinally and screw-threaded toward the outer or feeding end. B is the mandrel, threaded at one end to correspond to the screw in the body, and tapering toward the other extremity. C is the head or roller-stock, screwed into the body A, containing the friction and expanding rollers D D. These rollers fit in oblong slots having curved sides, and which extend to the innermost end of the stock. The rollers, after insertion, are held in place in the slots by plugs *d d*. A series of grooves of different lengths is made on the periphery of the body, as shown at *a a'*, &c. E is a band surrounding the body A, and provided with an internal stud, *e*, which fits in any of the grooves *a a'*, &c., so as to permit an exposure of the expanding-rollers corresponding to the thickness of the crown-sheet of the boiler. By sliding this band off the body and turning it around, the stud *e* may be made to enter any one of the grooves *a a'*, &c., and the exposure of the rollers C C governed accordingly. F is a clutch sliding on the mandrel B, but prevented from turning on it by means of a stud in the former entering a longitudinal groove in the latter. When the clutch is slid down toward the lower end B' of the mandrel, the latter, when turned, will screw into the body A. When, however, the clutch is slid up to engage with said body, as shown, on turning the mandrel it will no longer feed or screw into the body A, but will turn with said body, thereby permitting the flue to be smoothed without at the same time being expanded.

The operation of the tool is as follows: The exposure of the rollers having been regulated, the tool is inserted into the tube until the band E meets the crown-sheet of the boiler. The mandrel is then turned by a lever applied at the end B'. The rotation of the mandrel, owing to the screw-thread, advances the tapering end, spreading apart the rollers C C and correspondingly expanding the flue.

The advantages of the foregoing construction are briefly as follows: The mandrel being advanced by screwing instead of by driving, as heretofore, a much greater pressure and uniformity is thereby obtained.

The particular disadvantage of driving is that it speedily destroys the tool, breaking the rollers from their bearings and shattering the mandrel when impregnated with frost. The rollers being inserted from the inner end of their stock permits the latter to be made solid, dispensing with the cap heretofore employed, which, being held on by screws, was extremely liable to be forced off when the mandrel was advanced. The clutch arrangement enables the roller-stock and body to be revolved without expanding the rollers whenever it may be desired to smooth the flues, as is frequently necessary.

The construction of the band for governing the exposure of the rollers and its combination with the grooved body affords a much more ready and efficacious means of adjustment than that heretofore obtained with a set-screw, which, to be regulated, requires a wrench, and which is liable to be forced off in working.

What I claim as my invention is—

1. The roller-stock C, having recesses made for the insertion of the rollers from its inner end, and for plugs to retain the same in their places, substantially as described.

2. In combination with the body A, having the graduated grooves $a$ $a'$, &c., and the expanding-rollers D, the band E, provided with a stud, $e$, for governing the exposure of the expanding-rollers, substantially as shown and described.

3. The combination, in a boiler-tube expander, of the body A, internally threaded for the reception of the mandrel roller-stock C, formed in a separate piece from the body A, and removable therefrom, adjusting-band E, and screw-threaded tapering mandrel B, substantially as shown and described.

In testimony that I claim the foregoing I have hereunto set my hand this 21st day of August, 1874.

ORESTES PAGAN.

Witnesses:
FRANK HARTMAN,
JNO. A. BELL.